United States Patent
Song et al.

(10) Patent No.: US 8,901,227 B2
(45) Date of Patent: Dec. 2, 2014

(54) FINE-PARTICLE, CATIONIC, AQUEOUS POLYMER DISPERSIONS, METHOD FOR THE PRODUCTION THEREOF, AND USE THEREOF

(75) Inventors: Anja Song, Mannheim (DE); Holger Kern, Kirchardt (DE)

(73) Assignee: BASF SE, Ludwigshafen (DE)

( * ) Notice: Subject to any disclaimer, the term of this patent is extended or adjusted under 35 U.S.C. 154(b) by 219 days.

(21) Appl. No.: 13/376,078

(22) PCT Filed: Jun. 1, 2010

(86) PCT No.: PCT/EP2010/057615
§ 371 (c)(1),
(2), (4) Date: Dec. 2, 2011

(87) PCT Pub. No.: WO2010/139683
PCT Pub. Date: Dec. 9, 2010

(65) Prior Publication Data
US 2012/0083563 A1    Apr. 5, 2012

(30) Foreign Application Priority Data
Jun. 4, 2009   (EP) .................................... 09161929

(51) Int. Cl.
| C08F 2/16 | (2006.01) |
| C08L 11/02 | (2006.01) |
| C08L 13/02 | (2006.01) |
| C08F 220/56 | (2006.01) |
| C08F 2/28 | (2006.01) |
| C08F 257/02 | (2006.01) |
| C09J 151/00 | (2006.01) |
| C08F 285/00 | (2006.01) |
| D21H 21/16 | (2006.01) |
| D21H 17/37 | (2006.01) |
| D21H 17/36 | (2006.01) |

(52) U.S. Cl.
CPC .................. *C08F 2/28* (2013.01); *C08F 220/56* (2013.01); *D21H 17/375* (2013.01); *C08F 257/02* (2013.01); *C09J 151/003* (2013.01); *C08F 285/00* (2013.01); *D21H 17/36* (2013.01); *D21H 17/37* (2013.01); *D21H 21/16* (2013.01)
USPC ........... 524/460; 523/201; 524/521; 524/522; 524/523; 526/201; 526/203

(58) Field of Classification Search
USPC .................. 523/201; 524/460, 521, 522, 523; 526/201, 203
See application file for complete search history.

(56) References Cited

U.S. PATENT DOCUMENTS

| 4,051,093 A | 9/1977 | Wendel et al. |
| 4,434,269 A | 2/1984 | Probst et al. |
| 4,659,431 A | 4/1987 | Probst et al. |
| 7,579,414 B2 * | 8/2009 | Kukula et al. .................. 526/65 |
| 2002/0040088 A1 | 4/2002 | Hauschel et al. |
| 2008/0039598 A1 | 2/2008 | Kukula et al. |
| 2010/0022701 A1 | 1/2010 | Brockmeyer et al. |

FOREIGN PATENT DOCUMENTS

| DE | 24 52 585 | 5/1976 |
| DE | 24 54 397 | 5/1976 |
| EP | 0 051 144 | 5/1982 |
| EP | 0 058 313 | 8/1982 |
| EP | 1 180 527 | 2/2002 |
| WO | 2005 121195 | 12/2005 |
| WO | 2008 071690 | 6/2008 |

OTHER PUBLICATIONS

U.S. Appl. No. 13/988,527, filed May 21, 2013, Song, et al.
International Search Report issued Aug. 26, 2010 in PCT/EP10/57615 filed Jun. 1, 2010.
International Search Report and Written Opinion issued Aug. 26, 2010 in patent application No. PCT/EP2010/057615 filed Jun. 1, 2010 with English translation of Category of Cited Documents.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

A finely divided, cationic, aqueous polymer dispersion, obtained by (I) solution polymerizing a first mixture containing (a) 15-40% by weight of a mixture of (a1) a (meth)acrylate and (a2) a (meth)acrylamide, (b) 40-85% by weight of styrene, (c) 0.5-5% by weight of an ethylenically unsaturated monomer, and (d) 0-20% by weight of a nonionic, ethylenically unsaturated monomer differing from (b); (II) adding water; and (III) emulsion polymerizing a second monomer mixture containing (i) 0-29% by weight of styrene, (ii) 50-100% by weight of a $C_1$- to $C_{18}$-(meth)acrylate, (iii) 0-30% by weight of a vinyl ester of a $C_1$-$C_{30}$-carboxylic acid, and (iv) 0-30% by weight of a nonionic ethylenically unsaturated monomer differing from (i), (ii), and (iii), wherein at least one of the solution and emulsion polymerizing are performed in the presence of 0-10% by weight of a regulator.

17 Claims, No Drawings

FINE-PARTICLE, CATIONIC, AQUEOUS POLYMER DISPERSIONS, METHOD FOR THE PRODUCTION THEREOF, AND USE THEREOF

The invention relates to finely divided, cationic, aqueous polymer dispersions which are obtainable by a two-stage polymerization, a cationic prepolymer being prepared as a dispersant in the first polymerization stage and thereafter an emulsion polymerization being carried out in an aqueous solution of this prepolymer in the presence of ethylenically unsaturated monomers, a process for their preparation and their use as sizes for paper, board and cardboard.

DE 24 52 585 A1 discloses aqueous copolymer dispersions which are obtainable by a two-stage polymerization in the aqueous phase, first a copolymer of a monomer containing acid groups and an ethylenically unsaturated monomer having a tertiary or quaternary amino group or a heterocyclic group comprising nitrogen being prepared by copolymerization in the aqueous phase and then, with further copolymerization, styrene and/or acrylonitrile and optionally (meth) acrylate and optionally further olefinically unsaturated monomers being added and polymerization being completed. The polymer dispersions thus prepared are used as sizes for paper.

DE 24 54 397 A1 discloses cationic aqueous copolymer dispersions which are prepared by emulsion copolymerization of olefinically unsaturated monomers in the presence of cationic polymeric dispersants/protective colloids. For this purpose, a prepolymer is synthesized by solution polymerization of hydrophobic ethylenically unsaturated monomers with monomers which comprise quaternary or ternary nitrogens, in water-miscible solvents, preferably alcohols or acetone. After addition of water and formic acid in order to protonate tertiary amino groups, hydrophobic monomers, such as styrene, acrylonitrile, (meth)acrylates and/or butadiene are then copolymerized optionally with up to 10% by weight of α,β-monoolefinically unsaturated carboxylic acids, in the aqueous solution of the prepolymer by an emulsion polymerization method. The monomers are chosen so that the glass transition temperature of the copolymer is from −15 to +60° C. The dispersions thus obtainable are used as coating materials for paper, leather or sheet-like textile structures and as sizes for paper.

EP 0 051 144 A1 describes amphoteric, finely divided, aqueous polymer dispersions which are prepared by a two-stage polymerization. In the first stage of the preparation, a low molecular weight prepolymer is synthesized in a solution copolymerization in a water-miscible solvent, the monomer mixture used comprising from 0.5 mol to 1.5 mol of an ethylenically unsaturated carboxylic acid in addition to further monomers, in each case per mole of nitrogen-containing monomer which carries an amino group and/or a quaternary amino group. The prepolymer is then dispersed in water and reacted in an emulsion polymerization with nonionic, ethylenically unsaturated monomers with the use of customary water-soluble initiators. The dispersions obtained are used as engine sizes and surface sizes for paper.

EP 0 058 313 A1 discloses cationic paper sizes which are obtainable by first preparing a water-soluble cationic terpolymer consisting of N,N-dimethylaminoethyl acrylate and/or methacrylate, styrene and acrylonitrile by solution polymerization in an alcohol. After a subsequent quarternization reaction, at least 10% of the N,N-dimethylamino groups present should be present in quaternized form and the remainder in protonated form. This terpolymer is used as an emulsifier in the subsequent free radical emulsion polymerization of a monomer mixture of acrylonitrile/methacrylonitrile and (meth)acrylates.

U.S. Pat. No. 4,659,431 describes a cationic paper size which is likewise prepared by a two-stage process. First, a terpolymer is prepared by polymerizing a monomer mixture consisting of N,N-dimethylaminoethyl acrylate and/or methacrylate, styrene and acrylonitrile by a solution polymerization method in an alcohol. Subsequently, at least 10% of the N,N-dimethylamino groups are quaternized while the remainder are present in protonated form. The terpolymer is used as an emulsifier in the free radical emulsion polymerization of a monomer mixture which comprises up to 90% by weight of acrylonitrile and/or methacrylonitrile, from 5 to 95% by weight of styrene and from 5 to 95% by weight of (meth)acrylates.

EP 1 180 527 A1 discloses cationic, finely divided, aqueous polymer dispersions which are used as engine sizes and surface sizes for paper. The preparation of the dispersion is likewise effected in a two-stage process in which first, in a saturated $C_1$- to $C_6$-carboxylic acid, a solution polymer is synthesized which is then used in an emulsion polymerization of an optionally substituted styrene and of a (meth)acrylate. The emulsion polymerization is carried out with the use of customary, water-soluble initiators, e.g. peroxides, together with redox systems.

WO 05/121195 A1 discloses further finely divided, amphoteric, aqueous polymer dispersions which are suitable as sizes for paper, board and cardboard. These dispersions are likewise prepared in a two-stage process. First, a prepolymer is prepared from a (meth)acrylate and/or (meth)acrylamide having a free, protonated and/or quaternized amino group, an optionally substituted styrene optionally acrylonitrile and/or methacrylonitrile, an ethylenically unsaturated monomer comprising acid groups and, optionally a nonionic ethylenically unsaturated monomer differing therefrom. An aqueous solution of the prepolymer thus obtained is then subjected to an emulsion polymerization with at least one nonionic ethylenically unsaturated monomer. This at least one ethylenically unsaturated monomer may be an optionally substituted styrene, a $C_1$- to $C_{18}$-(meth)acrylate and optionally nonionic, ethylenically unsaturated monomers differing therefrom.

WO 08/071690 A1 describes a further finely divided, cationic polymer dispersion which is likewise used as a size for paper, board and cardboard. In the two-stage process, first a prepolymer is prepared from a (meth)acrylate, an optionally substituted styrene, optionally acrylonitrile or (meth)acrylonitrile, an ethylenically unsaturated carboxylic acid or carboxylic anhydride and optionally an ethylenically unsaturated monomer differing therefrom. An aqueous solution of the prepolymer is then reacted in an emulsion polymerization with acrylonitrile and/or methacrylonitrile, a $C_1$- to $C_4$-acrylate or methacrylate, a $C_6$- to $C_{14}$-acrylate or methacrylate and optionally nonionic monomers differing therefrom.

There is however a continuous need in the paper industry for novel, more effective engine sizes and surface sizes for the production of paper, board and cardboard.

It was therefore the object of the present invention to provide further polymer dispersions which have an improved efficiency as paper sizes compared with the known polymer dispersions.

The object is achieved, according to the invention, by finely divided, cationic, aqueous polymer dispersions which are obtainable by emulsion polymerization of ethylenically unsaturated monomers in an aqueous solution of a cationic prepolymer as a dispersant, wherein first the cationic prepolymer is prepared in the presence of polymerization initiators by polymerization of
  a) from 15 to 40% by weight of a mixture of at least two different (meth)acrylates which in each case have an amino group and/or quaternary ammonium group and/or (meth)acrylamides which in each case carry an amino group and/or quaternary ammonium group,
  b) from 40 to 85% by weight of at least one optionally substituted styrene,
  c) from 0.5 to 5% by weight of at least one ethylenically unsaturated monomer comprising acid groups and
  d) from 0 to 20% by weight of at least one nonionic, ethylenically unsaturated monomer differing from (b), the sum of (a)+(b)+(c)+(d) being 100% by weight, in a solution polymerization in a partly to completely water-miscible solvent, and water is then added to the solution/dispersion of the prepolymer, and thereafter, in the aqueous solution of the prepolymer, an emulsion polymerization is carried out, in the presence of polymerization initiators, of a monomer mixture comprising
  (i) from 0 to 29% by weight of at least one optionally substituted styrene,
  (ii) from 50 to 100% by weight of at least one $C_1$- to $C_{18}$-(meth)acrylate,
  (iii) from 0 to 30% by weight of at least one vinyl ester of linear or branched $C_1$-$C_{30}$-carboxylic acids and
  (iv) from 0 to 30% by weight of at least one nonionic ethylenically unsaturated monomer differing from (i), (ii) and (iii),
the sum of (i)+(ii)+(iii)+(iv) being 100% by weight,
and the solution polymerization and/or emulsion polymerization is carried out in the presence of from 0 to 10% by weight of at least one polymerization regulator.

The molar amount of the cationic and/or basic monomers (a) which is incorporated into the prepolymer is of course always higher than the amount of the anionic monomers (c), so that the prepolymer is cationic.

The cationic prepolymer which acts as a dispersant or protective colloid for the emulsion polymerization is prepared in a first stage of the polymerization. It is a solution polymer which, if required, can be stored for a relatively long time. Usually, it is used as a dispersant immediately after its preparation in the second stage of the polymerization.

The cationic prepolymer is obtainable by polymerization of the abovementioned monomer mixtures (a), (b), (c) and optionally (d) in the presence of at least one polymerization initiator.

For the preparation of the prepolymer, a mixture of at least two different, cationic or basic (meth)acrylates, which in each case have an amino group and/or quaternary ammonium group, and/or different, cationic or basic (meth)acrylamides, which in each case carry an amino group and/or quaternary ammonium group, is used as monomers of the group (a). Of course, it is possible to use either only mixtures of at least two different (meth)acrylates or of at least two different (meth)acrylamides. It is also possible to use a mixture of at least one (meth)acrylate and at least one (meth)acrylamide.

The prepolymer which is prepared in the first polymerization stage comprises, as component (a), nitrogen-containing monomers which carry an amino group and/or a quaternary ammonium group.

Such compounds having an amino group are those of the general formula (I):

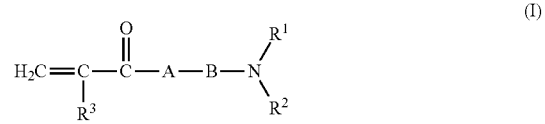

in which
A is O, NH,
B is $C_nH_{2n}$, where n is an integer in the range from 1 to 8,
$R^1$, $R^2$ are $C_mH_{2m+1}$, where m is an integer in the range from 1 to 4, and
$R^3$ is H, $CH_3$.

The compounds having quaternary ammonium groups can be characterized with the aid of the following formula (II):

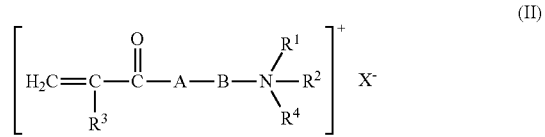

in which
$X^-$ is $OH^-$, $Cl^-$, $Bi^-$, $CH_3$—$OSO^{3-}$,
$R_4$ is $C_mH_{2m+}$, m is an integer in the range from 1 to 4, and the remaining substituents have the abovementioned meaning.

The compounds of the formula (II) are designated as a rule as cationic monomers and those of the formula (I) as basic monomers. Basic, ethylenically unsaturated monomers are, for example, acrylates and methacrylates of amino alcohols, e.g. N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-dibutylaminopropyl acrylate, N,N-dibutylaminopropyl methacrylate, N,N-dimethylaminoneopentyl acrylate, derivatives of acrylamide or of methacrylamide which comprise amino groups, such as N,N-dimethylaminoethylacrylamide, N,N-dimethylaminoethylmethacrylamide, N,N-dimethylaminopropylacrylamide and N,N-dimethylaminopropylmethacrylamide.

The quaternary compounds of the formula (II) are obtained by reacting the basic monomers of the formula (I) with known quaternizing agents, for example with methyl chloride, benzyl chloride, ethyl chloride, butyl bromide, dimethyl sulfate and diethyl sulfate or epichlorohydrin. In the quaternary form, these monomers lose their basic character. The following may be mentioned as examples: N,N,N-trimethylammoniumethyl acrylate chloride, N,N,N-trimethylammoniumethyl methacrylate chloride, N,N,N-trimethylammoniumethyl methacrylamide chloride, N,N,N-trimethylammoniumpropylacrylamide chloride, N,N,N-trimethylammoniumpropylmethacrylamide chloride, N,N,N-trimethylammoniumethylacrylamide chloride, and the corresponding methosulfates and sulfates.

Preferably, the monomers of group (a) are selected from N,N-dimethylaminopropylmethacrylamide, N,N-dimethylaminoethyl methacrylate and N,N-dimethylaminoethyl acrylate, and used in each case in the form of the salt with at least one mineral acid or carboxylic acid and/or in quaternary form. A preferred quaternizing agent is methyl chloride.

The monomers of group (a) are used in the preparation of the prepolymer in an amount of from 15 to 40% by weight, preferably from 20 to 35% by weight, based on the monomer mixture (a) to (d).

For the preparation of the prepolymer, optionally substituted styrenes, such as styrene, α-methylstyrene or ethylstyrene, are used as monomers of group (b). The monomers of group (b) are present in an amount of from 40 to 70% by weight, preferably from 50 to 70% by weight, in the monomer mixture comprising (a) to (d).

Examples of monomers of group (c) are ethylenically unsaturated $C_3$- to $C_6$-carboxylic acids, such as acrylic acid, methacrylic acid, maleic acid, fumaric acid, itaconic acid, ethacrylic acid, crotonic acid, monoesters of ethylenically unsaturated dicarboxylic acids, such as monomethyl maleate, monomethyl fumarate, monoethyl maleate, monoethyl fumarate, monopropyl maleate, monopropyl fumarate, mono-n-butyl maleate and mono-n-butyl fumarate, and styrenecarboxylic acids and ethylenically unsaturated anhydrides, such as maleic anhydride and itaconic anhydride. Depending on the water content of the solvent used in the first polymerization stage, the anhydride groups of the monomers are hydrolyzed to carboxyl groups. The anhydride groups are hydrolyzed in each case before the second polymerization stage if in fact the polymer solution obtained in the first polymerization stage is diluted with water. In addition, monomers comprising sulfo and/or phosphonic acid groups, such as 2-acrylamido-2-methylpropanesulfonic acid and vinylphosphonic acid, are suitable as monomers (c). The monomers comprising acid groups can be used in the form of the free acid groups and in the form partly or completely neutralized with alkali metal bases, alkaline earth metal bases, ammonia and/or amines. For example, sodium hydroxide solution, potassium hydroxide solution, sodium carbonate, sodium bicarbonate, ammonia, trimethylamine, triethylamine, morpholine, ethanolamine, diethanolamine, triethanolamine or diethylenetriamine is used for neutralizing the acid groups of the monomers. It is of course possible to use two or more bases as neutralizing agents.

From this group of monomers, acrylic acid and methacrylic acid or mixtures of acrylic acid and methacrylic acid in any desired ratio are preferably used. The monomers of group (c) are present in an amount of from 0.5 to 5% by weight, preferably from 0.7 to 3.5% by weight, in the monomer mixture comprising (a) to (d).

The monomer mixtures used for the preparation of the prepolymer may comprise nonionic, ethylenically unsaturated monomers (d) which are different from the monomers (b). Examples of such monomers are amides, such as, for example, acrylamide, methacrylamide, N-methylacrylamide, N-methylmethacrylamide, N-ethylacrylamide and N-ethylmethacrylamide; vinyl compounds, such as vinyl acetate, vinyl propionate or vinylformamide; $C_1$- to $C_{18}$-(meth)acrylates, such as, for example, methyl acrylate, methyl methacrylate, ethyl acrylate, ethyl methacrylate, propyl acrylate, propyl methacrylate, isopropyl acrylate, isopropyl methacrylate, n-butyl acrylate, isobutyl acrylate and tert-butyl acrylate, n-butyl methacrylate, iso-butyl methacrylate and tert-butyl methacrylate, hexyl acrylate, hexyl methacrylate, ethylhexyl acrylate, ethylhexyl methacrylate, cyclohexyl acrylate, cyclohexyl methacrylate, n-decyl acrylate, decyl methacrylate, lauryl acrylate, lauryl methacrylate, stearyl acrylate, stearyl methacrylate or the esters of acrylic acid or methacrylic acid which were prepared by reacting at least one ethylene oxide unit, for example hydroxyethyl methacrylate or diethylene glycol monomethacrylate. It is of course also possible to use mixtures of said monomers. If the monomers of group (d) are used, they are present in an amount of up to 20% by weight, in general in an amount of up to 10% by weight, based on the total amount of the monomers (a) to (d) in the monomer mixture.

The sum of the data in % by weight for the monomers (a) to (d) is always 100.

Preferred finely divided, cationic polymer dispersions are those wherein the cationic prepolymer is obtainable by polymerization of
 (a) from 15 to 40% by weight of a mixture of at least two compounds selected from N,N-dimethylaminopropylmethacrylamide, N,N-dimethylaminoethyl methacrylate and N,N-dimethylaminoethyl acrylate,
 (b) from 40 to 85% by weight of styrene, and
 (c) from 0.5 to 5% by weight of acrylic acid and/or methacrylic acid.

In the first polymerization stage, the monomers (a) to (d) are polymerized by a solution polymerization method in a partly or completely water-miscible solvent which may comprise up to 15% by weight of water. Preferably, virtually anhydrous solvents are used. The solvents generally comprise up to about 1% by weight of water. Examples of suitable solvents are $C_1$- to $C_3$-carboxylic acids, such as formic acid, acetic acid and propionic acid, alcohols, such as methanol, ethanol, propanol and isopropanol, ketones, such as acetone and methyl ethyl ketone, amides, such as dimethylformamide, and dimethyl sulfoxide, carbonates, such as propylene carbonate or ethylene carbonate, and tetrahydrofuran. If solvents free of acid groups are used, the monomers (c) comprising acid groups are neutralized, preferably before the polymerization. In the first polymerization stage, preferably anhydrous formic acid, anhydrous acetic acid or isopropanol is used. The other reactants are then preferably likewise used in anhydrous form.

The solution polymerization in the first polymerization stage is effected in the presence of polymerization initiators which, under the polymerization conditions, form free radicals at temperatures in the range from 20 to 160° C., preferably from 60 to 120° C. If the polymerization temperature should be above the boiling point of the solvent used, the polymerization is carried out under elevated pressure, for example in an autoclave equipped with a stirrer. Preferably used initiators are those which dissolve in the organic, water-miscible solvent, for example azobisisobutyronitrile, tert-butyl peroctanoate, tert-butyl perbenzoate, benzoyl peroxide, tert-butyl perpivalate, lauroyl peroxide, di-tert-butyl peroxide, tert-butyl hydroperoxide and hydrogen peroxide, optionally in the presence of heavy metal cations, such as, for example, cations of iron, cerium or manganese.

The monomers are used in the first polymerization stage, based on the solvent, in an amount such that polymer solutions having a polymer content of from 15 to 70% by weight, preferably from 30 to 65% by weight, are obtained. The polymers are preferably soluble in the organic, partly to completely water-miscible solvent to give a clear solution. The solution polymers obtained in the first stage are used as a dispersant/protective colloid or possibly as seed for the subsequent emulsion polymerization. For this purpose, it is necessary to add water to the prepolymer solution or to introduce the polymer solution into water. An aqueous polymer solution which may also comprise disperse fractions (colloidal solution) is obtained, from which the organic, partly to completely water-miscible solvent can be distilled off, optionally under reduced pressure.

The cationic prepolymers prepared in the first stage have a relatively low molar mass, for example Mw of from 1000 to 100 000, preferably from 5000 to 50 000 (determined by light scattering). The determination of the molecular weight distribution and of the mass average molecular weight can be carried out by methods known to the person skilled in the art, such as, for example, gel permeation chromatography, light scattering or ultracentrifuging.

The concentration of the solution polymer prepared in the first polymerization stage in the polymer solution to which water has been added is, for example, from 2 to 35, preferably from 15 to 25, % by weight. The prepolymer solution to which water has been added is then used in the second stage of the polymerization as an initially taken mixture or emulsifier/protective colloid and possibly as seed for the emulsion polymerization.

In the aqueous solution of the prepolymer, the preparation of the emulsion polymer is effected in a second polymerization stage. For this purpose, a monomer mixture comprising
  (i) from 0 to 29% by weight of at least one optionally substituted styrene,
  (ii) from 50 to 100% by weight of at least one $C_1$- to $C_{18}$-(meth)acrylate,
  (iii) from 0 to 30% by weight of at least one vinyl ester of linear or branched $C_1$-$C_{30}$-carboxylic acids and
  (iv) from 0 to 30% by weight of a nonionic monomer differing from the monomers (i), (ii) and (iii),
  the sum of (i)+(ii)+(iii)+(iv) being 100% by weight,
is polymerized.

The monomers of group (i) correspond to those of group (b) from the cationic prepolymer.

The monomers of group (ii) include (meth)acrylates of $C_1$- to $C_{16}$-alcohols. Monomers (ii) are, for example, methyl acrylate, ethyl acrylate, n-propyl acrylate, isopropyl acrylate, n-butyl acrylate, sec-butyl acrylate, isobutyl acrylate, tert-butyl acrylate, ethylhexyl acrylate, n-octyl acrylate, cyclohexyl acrylate, decyl acrylate, dodecyl acrylate, tetradecyl acrylate, methyl methacrylate, ethyl methacrylate, n-propyl methacrylate, isopropyl methacrylate, n-butyl methacrylate, sec-butyl methacrylate, isobutyl methacrylate, tert-butyl methacrylate, ethylhexyl methacrylate, n-octyl methacrylate, cyclohexyl methacrylate, decyl methacrylate, dodecyl methacrylate and tetradecyl methacrylate. From this group of monomers, n-butyl acrylate and tert-butyl acrylate are preferably used, in each case alone or in any desired mixtures. In such mixtures of n-butyl acrylate and tert-butyl acrylate, the weight ratio is usually from 3:1 to 1:3. However, ethylhexyl acrylate and ethylhexyl methacrylate are also suitable.

Monomers of group (iii) are vinyl esters of linear or branched $C_1$-$C_{30}$-carboxylic acids. Such carboxylic acids are saturated and straight-chain, such as formic acid, acetic acid, propionic acid, butyric acid, valeric acid, caproic acid (hexanoic acid), heptanoic acid, caprylic acid (octanoic acid), pelargonic acid, capric acid (decanoic acid), undecanoic acid, lauric acid (dodecanoic acid), tridecanoic acid, myristic acid (tetradecanoic acid), pentadecanoic acid, palmitic acid, margaric acid, stearic acid, nonadecanoic acid, arachidic acid, behenic acid, lignoceric acid (tetracosanoic acid), cerotinic acid, melissic acid (triacontanoic acid). According to the invention, saturated, branched carboxylic acids, such as, for example, isobutyric acid, isovaleric acid (3-methylbutyric acid) and tuberculostearic acid, and strongly branched saturated carboxylic acid are also suitable. The latter are known by the term versatic acids, such as, for example, pivalic acid, neohexanoic acid, neoheptanoic acid, neooctanoic acid, neononanoic acid and neodecanoic acid. Suitable vinyl esters of linear or branched $C_1$-$C_{30}$-carboxylic acids are, for example, vinyl laurate, vinyl stearate, vinyl propionate, vinyl versatate, vinyl acetate, vinyl propylheptanoate, vinyl neodecanoate (VeoVa® 10 from Hexion Specialty Chemicals), vinyl neononanoate (VeoVa® 9 from Hexion Specialty Chemicals) and vinyl pelargonate.

Examples of suitable monomers of group (iv) are acrylamide, methacrylamide, N-methylolacrylamide, N-methylolmethacrylamide, N—$C_1$- to $C_{18}$-alkylacrylamides, N—$C_1$- to $C_{18}$-alkylmethacrylamides, N-vinylamides, $C_1$- to $C_{18}$-alkyl vinyl ethers, hydroxyalkyl esters and esters of monoethylenically unsaturated mono- and dicarboxylic acids with $C_2$-$C_4$-polyalkylene glycols.

The monomers of group (iv) furthermore include the monoethylenically unsaturated monomers which have already been mentioned under (a) and have at least one amino group protonatable in an aqueous medium and/or a quaternary ammonium group.

In addition, crosslinking monomers can also be used as monomers (iv). Examples of such crosslinking agents are butanediol diacrylate, butanediol dimethacrylate, hexanediol diacrylate, hexanediol dimethacrylate, glycol diacrylate, glycol dimethacrylate, trimethylolpropane triacrylate, trimethylolpropane trimethacrylate, pentaerythrityl triacrylate, pentaerythrityl tetraacrylate, diacrylates and dimethacrylates of alkoxylated dihydric alcohols, divinylurea and/or conjugated diolefins, such as butadiene or isoprene.

Depending on the intended use, the monomers of group (iv) may also comprise so-called functional monomers, i.e. monomers which, in addition to a polymerizable C=C double bond, also have a reactive functional group, for example an oxirane group, a reactive carbonyl group, e.g. an acetoacetyl group, an isocyanate group, an N-hydroxymethyl group, an N-alkoxymethyl group, a trialkylsilyl group, a trialkoxysilyl group or another group reactive toward nucleophiles.

A monomer mixture comprising
  (i) from 0 to 29% by weight of styrene,
  (ii) from 71 to 100% by weight of n-butyl acrylate, tert-butyl acrylate or mixtures of n-butyl acrylate and tert-butyl acrylate in the weight ratio of from 3:1 to 1:3
is preferred.

The polymerization of the monomers (i), (ii), optionally (iii) and optionally (iv) is effected by an emulsion polymerization method, i.e. the monomers to be polymerized are present in the polymerization mixture as an aqueous emulsion. The cationic prepolymers described above are used for stabilizing the monomer emulsions.

The emulsion polymerization is effected in general in a temperature range of from 40 to 150° C., preferably from 60 to 90° C., in the presence of customary amounts of preferably water-soluble polymerization initiators. In general, from 0.2 to 4, preferably from 0.5 to 2, % by weight of at least one initiator, based on the monomers to be polymerized, are used. Suitable initiators are, for example, azo compounds, peroxides, hydroperoxides, hydrogen peroxide, inorganic peroxides and redox systems, such as combinations of hydrogen peroxide and ascorbic acid or tert-butyl hydroperoxide and ascorbic acid. The redox systems can moreover comprise heavy metal cations, such as cerium, manganese or iron(II) ions, for activation.

In the emulsion polymerization, the monomers can either be metered directly into the initially taken mixture or they can be fed in the form of an aqueous emulsion or miniemulsion to the polymerization batch. In order to emulsify the monomers in water, for example, a part of the prepolymer diluted with water and obtained from the first polymerization stage can be used as an emulsifier or the monomers are emulsified with the aid of customary nonionic, anionic, cationic or amphoteric emulsifiers in water.

Customary emulsifiers are used only if required. The amounts used are, for example, from 0.05 to 3% by weight and are preferably in the range from 0.5 to 2% by weight.

Customary emulsifiers are described in detail in the literature, cf. for example M. Ash, I. Ash, Handbook of Industrial Surfactants, Third Edition, Synapse Information Resources Inc. Examples of customary emulsifiers are the reaction products of long-chain monohydric alcohols ($C_{10}$- to $C_{22}$-alkanols) with from 4 to 50 mol of ethylene oxide and/or propylene oxide per mole of alcohol or ethoxylated phenols or alkoxylated alcohols esterified with sulfuric acid, which are generally used in the form neutralized with alkalis. Further customary emulsifiers are, for example, sodium alkanesulfonates, sodium alkylsulfates, sodium dodecylbenzenesulfonate, sulfosuccinic esters, quaternary alkylammonium salts, alkylbenzylammonium salts, such as dimethyl-$C_{12}$- to $C_{18}$-alkylbenzylammonium chlorides, primary, secondary and tertiary fatty amine salts, quaternary amidoamine compounds, alkylpyridinium salts, alkylimidazolinium salts and alkyloxazolinium salts. Preferably, however, no emulsifiers are used.

The metering of the monomers for carrying out the emulsion polymerization can be effected continuously or batchwise. With the use of a monomer mixture, the metering of the monomers can be effected as a mixture or separately or in the manner of a step or gradient procedure. The addition can be effected uniformly or nonuniformly, i.e. with a changing metering rate, over the metering period. By adding a portion of the monomer to the initially taken mixture comprising aqueous solution/dispersion of the prepolymer, metering by means of a swelling procedure is possible.

In a preferred embodiment of the present invention, the solution polymerization and/or the emulsion polymerization is carried out in the presence of polymerization regulators. Suitable regulators are, for example, mercaptans, such as ethyl mercaptan, n-butyl mercaptan, tert-butyl mercaptan, n-dodecyl mercaptan or tert-dodecyl mercaptan, thioglycolic acid or carbon tetrabromide. Furthermore, suitable regulators are from the class consisting of the terpenes, preferably from the class consisting of the monocyclic terpenes and particularly preferably from the group consisting of the menthadienes. Among said regulators of the group consisting of the menthadienes, terpinolene is very particularly preferred. If polymerization regulators are used, the amounts of regulator are, for example, from 0.1 to 10% by weight, preferably from 0.5 to 5% by weight.

The pH of the reaction mixture is, for example, in the range from 1 to 5, in general from 2 to 4, in the second polymerization stage.

In order to remove the remaining monomers as substantially as possible from the polymer dispersion, a postpolymerization is expediently carried out after the end of the actual polymerization. For this purpose, for example, an initiator from the group consisting of hydrogen peroxide, peroxides, hydroperoxides and/or azo initiators is added to the polymer dispersion after the end of the main polymerization. Combining of the initiators with suitable reducing agents, such as, for example, ascorbic acid or sodium bisulfite, is also possible. Oil-soluble, sparingly water-soluble initiators are preferably used, for example customary organic peroxides, such as dibenzoyl peroxide, di-tert-butyl peroxide, tert-butyl hydroperoxide, cumyl hydroperoxide or biscyclohexyl peroxydicarbonate. For the postpolymerization, the reaction mixture is heated, for example, to a temperature which corresponds to the temperature at which the main polymerization was carried out or which is up to 20° C., preferably up to 10° C., lower. The main polymerization is complete when the polymerization initiator has been consumed or the monomer conversion is, for example, at least 98%, preferably at least 99.5%. For the postpolymerization, tert-butyl hydroperoxide is preferably used. The polymerization is carried out, for example, in a temperature range of from 40 to 110° C., in general from 50 to 105° C.

In the second polymerization stage, finely divided, aqueous polymer dispersions which have cationic properties owing to the composition of the prepolymer are obtained. The mean particle size of the dispersed particles is, for example, from 5 to 250 nm, preferably <100 nm, particularly preferably from 10 to 60 nm. The mean particle size can be determined by methods known to the person skilled in the art, such as, for example, laser correlation spectroscopy, ultracentrifuging or CHDF. A further measure of the particle size of the dispersed polymer particles is the LT value. For determining the LT value (light transmittance), the polymer dispersion to be investigated in each case is measured in 0.1% strength by weight aqueous formulation in a cell having an edge length of 2.5 cm with light of wavelength 600 nm. The mean particle size can be calculated from the measured values, cf. B. Verner, M. Bárta, B. Sedlácek, Tables of Scattering Functions for Spherical Particles, Prague 1976, Edice Marco, Rada D-DATA, SVAZEK D-1.

The polymer concentration of the aqueous dispersions obtained in the emulsion polymerization is, for example, from 15 to 45, preferably from 25 to 35, % by weight.

The invention also relates to a process for the preparation of the finely divided, cationic, aqueous polymer dispersions which are described above and are obtainable by emulsion polymerization of ethylenically unsaturated monomers in an aqueous solution of a cationic prepolymer as a dispersant, first the cationic prepolymer being prepared in the presence of polymerization initiators by polymerization of (a) from 15 to 40% by weight of a mixture of at least two different (meth)acrylates which in each case have an amino group and/or quaternary ammonium group and/or (meth)acrylamides which in each case carry an amino group and/or quaternary ammonium group, (b) from 40 to 85% by weight of at least one optionally substituted styrene, (c) from 0.5 to 5% by weight of at least one ethylenically unsaturated monomer comprising acid groups and (d) from 0 to 20% by weight of at least one nonionic, ethylenically unsaturated monomer differing from (b), the sum of (a)+(b)+(c)+(d) being 100% by weight, in a solution polymerization in a partly to completely water-miscible solvent, adding water to the solution/dispersion of the prepolymer and thereafter, in the aqueous solution of the prepolymer, carrying out an emulsion polymerization, in the presence of polymerization initiators, of a monomer mixture comprising (i) from 0 to 29% by weight of at least one optionally substituted styrene, (ii) from 50 to 100% by weight of at least one $C_1$- to $C_{18}$-(meth)acrylate, (iii) from 0 to 30% by weight of at least one vinyl ester of linear or branched $C_1$-$C_{30}$-carboxylic acids and (iv) from 0 to 30% by weight of at least one nonionic ethylenically unsaturated monomer differing from (i), (ii) and (iii), the sum of (i)+(ii)+(iii)+(iv) being 100% by weight, and carrying out the solution polymerization and/or emulsion polymerization in the presence of from 0 to 10% by weight of at least one polymerization regulator.

The finely divided, cationic aqueous polymer dispersions described above are used as sizes for paper, board and cardboard. They can be used for the production of all paper varieties, for example of writing and printing papers and packaging papers and papers for the packaging of liquids. They are suitable in particular for the surface sizing of paper products. The dispersions according to the invention can be processed by all methods suitable in surface sizing, but they can also be used for engine sizing. For use as a size, the aqueous polymer dispersions are diluted by adding water, generally to a polymer content of, for example, from 0.05 to 5% by weight. The amount of polymer dispersion depends on the desired degree of sizing of the papers or paper products to be finished. Such preparation solutions may comprise further substances, for example starch, dyes, optical brighteners, biocides, paper strength agents, fixing agents, antifoams, retention aids and/or drainage aids.

The size dispersion can be applied to paper, board or cardboard by means of a size press or other application units, such as a film press, speedsize or gate roll. The amount of polymer which is applied to the surface of paper products is, for example, from 0.005 to 1.0 $g/m^2$, preferably from 0.01 to 0.5 $g/m^2$.

Even in a very low dose, the polymer dispersions according to the invention exhibit an excellent sizing effect on all papers produced with different fiber types from unbleached softwood, unbleached deciduous wood, unbleached hardwood, bleached softwood, bleached deciduous wood, bleached hardwood, deinked fibers or mixtures of different fiber types. Furthermore, the dispersions according to the invention exhibit very good compatibility with the customary starches, for example potato starch, corn starch, wheat starch, tapioca starch. Moreover, the dispersions according to the invention exhibit complete development of sizing immediately after the production and drying of the paper web.

The invention is illustrated in more detail with reference to the following, nonlimiting examples.

EXAMPLES

The stated percentages in the examples are percent by weight, unless evident otherwise from the context.

Example 1

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 10 g of N,N-dimethylaminoethyl acrylate, 55 g of N,N-dimethylaminopropylmethacrylamide and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogenous polymer material at 85° C. After the addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min and the mixture was cooled to 70° C. Thereafter, 10 g of a 10% strength by weight ascorbic acid solution were added and stirring was effected for a further 20 min. A further addition of 10 g of a 10% strength by weight ascorbic acid solution was effected. Thereafter, the reaction mixture was stirred for a further 20 min. Finally, 5 g of a commercially available antifoam (Afranil® T from BASF SE) and 65 g of demineralized water were added and the mixture was cooled to room temperature.

A finely divided polymer dispersion having a solids content of 30.4% by weight and an LT value (0.1%) of 92.2% was obtained.

Example 2

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 10 g of N,N-dimethylaminoethyl acrylate, 55 g of N,N-dimethylaminopropylmethacrylamide and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogenous polymer material at 85° C. After the addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. The reaction mixture was then stirred for a further 30 min, cooling to 70° C. being effected. Finally, 5 g of a commercially available antifoam (Afranil® T from BASF SE) and 65 g of demineralized water were added and the mixture was cooled to room temperature.

A finely divided polymer dispersion having a solids content of 30.3% by weight and an LT value (0.1%) of 93.7% was obtained.

Example 3

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 10 g of N,N-dimethylaminoethyl acrylate, 55 g of N,N-dimethylaminopropylmethacrylamide, 5 g of acrylic acid and 2.5 g of terpinolene were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogenous polymer material at 85° C. After the addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. The reaction mixture was then stirred for a further 30 min, cooling to 70° C. being effected. Finally, 5 g of a commercially available antifoam (Afranil® T from BASF SE) and 65 g of demineralized water were added and the mixture was cooled to room temperature.

A finely divided polymer dispersion having a solids content of 29.1% by weight and an LT value (0.1%) of 85.8% was obtained.

Example 4

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 10 g of N,N-dimethylaminoethyl acrylate, 55 g of N,N-dimethylaminopropylmethacrylamide and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogenous polymer material at 85° C. After the addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene, 225 g of tert-butyl acrylate and 2.5 g of terpinolene was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. The reaction mixture was then stirred for a further 30 min, cooling to 70° C. being effected. Finally, 5 g of a commercially available antifoam (Afranil® T from BASF SE) and 65 g of demineralized water were added and the mixture was cooled to room temperature.

A finely divided polymer dispersion having a solids content of 26.5% by weight and an LT value (0.1%) of 86.7% was obtained.

Example 5

101.4 g of anhydrous acetic acid (glacial acetic acid) were initially taken in a plane-ground 2 l flask having a stirrer and internal temperature measurement and were heated to 105° C. under a nitrogen atmosphere. 155 g of styrene, 55 g of N,N-dimethylaminoethyl acrylate, 10 g of N,N-dimethylaminopropylmethacrylamide and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. and cooling to 75° C. was then effected. After addition of 1.5 g of 10% strength by weight iron(II) sulfate solution and 5 g of a 20% strength by weight reducing agent solution (Brüggolit® FF6 from Brüggemann), 20 g of 5% strength by weight hydrogen peroxide solution were added in the course of 30 min at 75° C. Thereafter, 35 g of styrene were added and the monomer feed consisting of a mixture of 20 g of styrene and 220 g of tert-butyl acrylate was immediately started and metered in over a period of 120 min. Simultaneously therewith, 80 g of a 5% strength by weight hydrogen peroxide solution were added in a period of 150 min in a separate feed. After the end of the initiator feed, postpolymerization was effected for 60 min. Thereafter, 5 g of a 20% strength by weight reducing agent solution (Brüggolit® FF6 from Brüggemann) and 5 g of a commercially available antifoam (Afranil® T from BASF SE) were added and stirring was effected for a further 30 min. A further 5 g of the 20% strength by weight reducing agent solution (Brüggolit® FF6 from Brüggemann) were then added, stirring was effected for a further 30 min and cooling to room temperature was effected.

A finely divided polymer dispersion having a solids content of 30.3% by weight and an LT value (0.1%) of 91.1% by weight was obtained.

Example 6

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 30 g of N,N-dimethylaminoethyl acrylate, 5 g of N,N-dimethylaminopropylmethacrylamide, 30 g of N,N-dimethylaminoethyl methacrylate and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. Thereafter, the reaction mixture was stirred for a further 30 min, cooling to 70° C. being effected. Finally, 5 g of a commercially available antifoam (Afranil® T from BASF SE) and 65 g of demineralized water were added and cooling to room temperature was effected.

A finely divided polymer dispersion having a solids content of 30.3% by weight and an LT value (0.1%) of 93.7% was obtained.

Example 7

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 30 g of N,N-dimethylaminoethyl acrylate, 5 g of N,N-dimethylaminopropylmethacrylamide, 30 g of N,N-dimethylaminoethyl methacrylate, 5 g of acrylic acid and 2.5 g of terpinolene were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. Thereafter, the reaction mixture was stirred for a further 30 min, cooling to 70° C. being effected. Finally, 5 g of a commercially available antifoam (Afranil® T from BASF SE) and 65 g of demineralized water were added and cooling to room temperature was effected.

A finely divided polymer dispersion having a solids content of 28.6% by weight and an LT value (0.1%) of 82.5% was obtained.

Example 8

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 30 g of N,N-dimethylaminoethyl acrylate, 5 g of N,N-dimethylaminopropylmethacrylamide, 30 g of N,N-dimethylaminoethyl methacrylate and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene, 225 g of tert-butyl acrylate and 2.5 g of terpinolene was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. 5 g of a 10% strength by weight ascorbic acid solution were then added. Thereafter, 20 g of a 5% strength by weight hydrogen peroxide solution were metered in in the course of 5 min. Thereafter, the reaction mixture was stirred for a further 30 min, cooling to 70° C. being effected. Finally, 5 g of a commercially available antifoam (Afranil® T from BASF SE) and 65 g of demineralized water were added and cooling to room temperature was effected.

A finely divided polymer dispersion having a solids content of 26.5% by weight and an LT value (0.1%) of 88.4% was obtained.

Example 9

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 30 g of N,N-dimethylaminoethyl acrylate, 5 g of N,N-dimethylaminopropylmethacrylamide, 30 g of N,N-dimethylaminoethyl methacrylate and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 40 g of styrene and 225 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. Thereafter, 10 g of a 10% strength by weight ascorbic acid solution were added and stirring was effected for a further 20 min. Thereafter, a further 10 g of a 10% strength by weight ascorbic acid solution were added and stirring was effected for a further 20 min. Finally, 5 g of a commercially available antifoam (Afranil® T from BASF SE) and 65 g of demineralized water were added and cooling to room temperature was effected.

A finely divided polymer dispersion having a solids content of 29.9% by weight and an LT value (0.1%) of 84.8% was obtained.

Example 10

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 30 g of N,N-dimethylaminoethyl acrylate, 5 g of N,N-dimethylaminopropylmethacrylamide, 30 g of N,N-dimethylaminoethyl methacrylate and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 53 g of styrene and 212 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. Thereafter, 10 g of a 10% strength by weight ascorbic acid solution were added and stirring was effected for a further 20 min. Thereafter, a further 10 g of a 10% strength by weight ascorbic acid solution were added and stirring was effected for a further 20 min. Finally, 5 g of a commercially available antifoam (Afranil® T from BASF SE) and 65 g of demineralized water were added and cooling to room temperature was effected.

A finely divided polymer dispersion having a solids content of 30.4% by weight and an LT value (0.1%) of 82.4% was obtained.

Example 11

101.4 g of anhydrous acetic acid (glacial acetic acid) were initially taken in a plane-ground 2 l flask having a stirrer and internal temperature measurement and were heated to 105° C. under a nitrogen atmosphere. 165 g of styrene, 10 g of N,N-dimethylaminoethyl acrylate, 55 g of N,N-dimethylaminopropylmethacrylamide, and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 53 g of styrene and 212 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min and cooling to 70° C. was effected. Thereafter, 10 g of a 10% strength by weight ascorbic acid solution were added and stirring was effected for a further 20 min. A further addition of 10 g of a 10% strength by weight ascorbic acid solution was effected. The reaction mixture was then stirred for a further 20 min. Finally, 5 g of a commercially available antifoam (Afranil® T from BASF SE) and 65 g of demineralized water were added and cooling to room temperature was effected.

A finely divided polymer dispersion having a solids content of 29.8% by weight and an LT value (0.1%) of 93.1% was obtained.

Example 12

101.4 g of anhydrous acetic acid (glacial acetic acid) were initially taken in a plane-ground 2 l flask having a stirrer and internal temperature measurement and were heated to 105° C. under a nitrogen atmosphere. 155 g of styrene, 30 g of N,N-dimethylaminoethyl acrylate, 5 g of N,N-dimethylaminopropylmethacrylamide, 30 g of N,N-dimethylaminoethyl methacrylate and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 55 g of styrene and 220 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min. Thereafter, 10 g of a 10% strength by weight ascorbic acid solution were added and stirring was effected for a further 20 min. Thereafter, a further 10 g of a 10% strength by weight ascorbic acid solution were added and stirring was effected for a further 20 min. Finally, 5 g of a commercially available antifoam (Afranil® T from BASF SE) and 65 g of demineralized water were added and cooling to room temperature was effected.

A finely divided polymer dispersion having a solids content of 31.3% by weight and an LT value (0.1%) of 74.6% was obtained.

Example 13

101.4 g of anhydrous acetic acid (glacial acetic acid) were initially taken in a plane-ground 2 l flask having a stirrer and internal temperature measurement and were heated to 105° C. under a nitrogen atmosphere. 155 g of styrene, 10 g of N,N-dimethylaminoethyl acrylate, 55 g of N,N-dimethylaminopropylmethacrylamide, and 5 g of acrylic acid were metered in with stirring in a period of 45 min at 105° C. Simultaneously with the monomer feed, the feed of 8.8 g of tert-butyl peroctanoate in 18.2 g of isopropanol was started and was metered in in the course of 60 min. The reaction mixture was then subjected to postpolymerization at 105° C. for 60 min.

870 g of demineralized water were then added to the homogeneous polymer material at 85° C. After addition of 1.5 g of 10% strength by weight iron(II) sulfate solution and 10 g of 10% strength by weight ascorbic acid solution, 20 g of 5% strength by weight hydrogen peroxide solution were added in the course of 30 min at 80° C. Thereafter, a mixture of 55 g of styrene and 220 g of tert-butyl acrylate was metered in at 80° C. over a period of 120 min. At the same time, 80 g of a 5% strength by weight hydrogen peroxide solution were added in a separate feed in a period of 150 min. After the end of the initiator feed, postpolymerization was effected for 30 min and cooling to 70° C. was effected. Thereafter, 10 g of a 10% strength by weight ascorbic acid solution were added and stirring was effected for a further 20 min. A further addition of 10 g of a 10% strength by weight ascorbic acid solution was effected. The reaction mixture was then stirred for a further 20 min. Finally, 5 g of a commercially available antifoam (Afranil® T from BASF SE) and 65 g of demineralized water were added and cooling to room temperature was effected.

A finely divided polymer dispersion having a solids content of 30.4% by weight and an LT value (0.1%) of 72.6% was obtained.

Comparative Example 1

According to Example 6 from WO 05/121195 A1

101.4 g of anhydrous acetic acid (glacial acetic acid) were initially taken in a plane-ground 2 l flask having a stirrer and internal temperature measurement and heated to 105° C. under a nitrogen atmosphere. 133 g of styrene, 57 g of N,N-dimethylaminoethyl methacrylate and 5 g of acrylic acid were metered in in a period of 45 min at 105° C. Simultaneously with the monomer feed, the feed of 8.8 g of tert-butyl peroctanoate in 18.2 g of isopropanol was started and metered in within 60 min. The reaction mixture was then subjected to postpolymerization at 105° C. for 30 min.

971.5 g of demineralized water were then added to the homogeneous polymer material at 60° C. in the course of 30 min. After addition of 7.5 g of a 1% strength by weight iron(II) sulfate solution and 5 g of a 10% strength by weight ascorbic acid solution, 20 g of 5% strength by weight hydrogen peroxide solution were added in the course of 30 min. Thereafter a mixture of 119.2 g of styrene and 119.2 g of tert-butyl acrylate was metered in at 60° C. over a period of 120 min. At the same time, in a separate feed, 80 g of a 5% strength by weight hydrogen peroxide solution were added in a period of 150 min. After the end of the initiator feed, postpolymerization was effected for 60 min at 60° C. and the reaction mixture was then cooled.

A finely divided polymer dispersion having a solids content of 26.5% by weight and an LT value (0.1%) of 87.5% was obtained.

Comparative Example 2

According to Example 8 from WO 05/121195 A1

101.4 g of anhydrous acetic acid (glacial acetic acid) were initially taken in a plane-ground 2 l flask having a stirrer and internal temperature measurement and heated to 105° C. under a nitrogen atmosphere. 133 g of styrene, 57 g of N,N-dimethylaminoethyl acrylate and 5 g of acrylic acid were metered in in a period of 45 min at 105° C. Simultaneously with the monomer feed, the feed of 8.8 g of tert-butyl peroctanoate in 18.2 g of isopropanol was started and metered in within 60 min. The reaction mixture was then subjected to postpolymerization at 105° C. for 30 min.

971.5 g of demineralized water were then added to the homogeneous polymer material at 60° C. in the course of 30 min. After addition of 7.5 g of a 1% strength by weight iron(II) sulfate solution and 5 g of a 10% strength by weight ascorbic acid solution, 20 g of 5% strength by weight hydrogen peroxide solution were added in the course of 30 min. Thereafter a mixture of 119.2 g of styrene and 119.2 g of tert-butyl acrylate was metered in at 60° C. over a period of 120 min. At the same time, in a separate feed, 80 g of a 5% strength by weight hydrogen peroxide solution were added in a period of 150 min. After the end of the initiator feed, postpolymerization was effected for 60 min at 60° C. and the reaction mixture was then cooled.

A finely divided polymer dispersion having a solids content of 30.9% by weight and an LT value (0.1%) of 56.6% was obtained.

Testing of performance characteristics of the polymer dispersions obtained according to the examples and the comparative examples For testing the surface sizing effect in use, the dispersions according to the invention and the comparative dispersions were applied by means of a laboratory size press to the test paper (100% waste paper, 80 g/m² basis weight, unsized). An aqueous solution of a degraded corn starch was adjusted to the desired concentration. The dispersions to be tested were then metered into the starch solution so that the size press liquor comprised 60 g/l of a degraded corn starch and 0.1-1.5 g/l of the dispersions.

The sizing effect of the dispersions which were obtained according to Examples 1-13 and Comparative examples 1 and 2 was then determined by surface application to the unsized test paper. For this purpose, the paper was passed twice through the size press, on average an increase in weight of about 65% being achieved.

The surface-size papers were dried on a drying cylinder at 90° C. The papers were then stored overnight in a conditioned room (23° C., 50% relative humidity) before the degree of sizing was determined.

For determining the degree of sizing of the surface-sized papers, the $Cobb_{60}$ and the $Cobb_{120}$ value were determined according to DIN 53 132. The $Cobb_{60}$ value is defined as the water absorption of the paper sheet in g/m² after contact with water and a contact time of 60 s (or 120 s in the case of $Cobb_{120}$ value). The lower the Cobb value, the better the sizing effect of the dispersion used. The test results are summarized in the following table.

TABLE

|  | $Cobb_{60}$ value [g/m²] | | | $Cobb_{120}$ value [g/m²] |
| --- | --- | --- | --- | --- |
| Amount applied [g/l] | 0.6 | 0.8 | 1.1 | 1.1 |
| Example 1 | 51 | 32 | 28 | 44 |
| Example 2 | 39 | 34 | 29 | 43 |
| Example 3 | 40 | 35 | 30 | 44 |
| Example 4 | 45 | 30 | 29 | 48 |
| Example 5 | 111 | 70 | 28 | 46 |
| Example 6 | 116 | 82 | 32 | 40 |
| Example 7 | 76 | 35 | 29 | 47 |
| Example 8 | 83 | 38 | 28 | 46 |
| Example 9 | 112 | 96 | 40 | 57 |
| Example 10 | 48 | 33 | 27 | 34 |
| Example 11 | 41 | 29 | 26 | 33 |
| Example 12 | 40 | 30 | 27 | 40 |
| Example 13 | 47 | 29 | 25 | 34 |
| Comparative example 1 | 140 | 120 | 110 | 126 |
| Comparative example 2 | 140 | 125 | 62 | 126 |

We claim:

1. A finely divided, cationic, aqueous polymer dispersion, obtained by a process comprising:
   (I) solution polymerizing, in a partly to completely water-miscible solvent, in the presence of a polymerization initiator, a first monomer mixture comprising
      (a) 15 to 40% by weight of a mixture comprising
         (a1) a (meth)acrylate comprising at least one selected from the group consisting of an amino group and a quaternary ammonium group, and (a2) a (meth)acrylamide comprising at least one selected from the group consisting of an amino group and a quaternary ammonium group,
      (b) 40 to 85% by weight of at least one optionally substituted styrene,
      (c) 0.5 to 5% by weight of at least one ethylenically unsaturated monomer comprising an acid group, and
      (d) 0 to 20% by weight of at least one nonionic, ethylenically unsaturated monomer differing from (b),
      wherein a sum of (a)+(b)+(c)+(d) is 100% by weight,
   to obtain a cationic prepolymer; then
   (II) adding water to a solution/dispersion of the cationic prepolymer, to obtain an aqueous solution of the cationic prepolymer; and thereafter
   (III) in the aqueous solution of the prepolymer, emulsion polymerizing, in the presence of the polymerization initiator, a second monomer mixture comprising
      (i) 0 to 29% by weight of styrene, and
      (ii) 71 to 100% by weight of n-butyl acrylate, tert-butyl acrylate, or a mixture of n-butyl acrylate and tert-butyl acrylate in a weight ratio range of 3:1 to 1:3,
      wherein a sum of (i)+(ii) is 100% by weight, and
   wherein at least one selected from the group consisting of the solution polymerizing (I) and the emulsion polymerizing (III) is performed in the presence of 0 to 10% by weight of at least one polymerization regulator.

2. The dispersion of claim 1, wherein the first monomer mixture comprises:
   (a) 15 to 40% by weight of a mixture comprising N,N-dimethylaminopropylmethacrylamide and at least one compound selected from the group consisting of N,N-dimethylaminoethyl methacrylate and N,N-dimethylaminoethyl acrylate;
(b) 40 to 85% by weight of styrene; and
(c) 0.5 to 5% by weight of at least one selected from the group consisting of acrylic acid and methacrylic acid.

3. The dispersion of claim 2, wherein the first monomer mixture comprises:
(a) 15 to 40% by weight of a mixture comprising N,N-dimethylaminopropylmethacrylamide and N,N-dimethylaminoethyl acrylate;
(b) 40 to 85% by weight of styrene; and
(c) 0.5 to 5% by weight of acrylic acid.

4. The dispersion of claim 2, wherein the first monomer mixture comprises:
(a) 15 to 40% by weight of a mixture comprising N,N-dimethylaminopropylmethacrylamide, N,N-dimethylaminoethyl methacrylate, and N,N-dimethylaminoethyl acrylate;
(b) 40 to 85% by weight of styrene; and
(c) 0.5 to 5% by weight of acrylic acid.

5. The dispersion of claim 1, wherein the at least one selected from the group consisting of the solution polymerizing (I) and the emulsion polymerizing (III) is performed in the presence of 0.1 to 10% by weight of at least one polymerization regulator.

6. The dispersion of claim 5, wherein the polymerization regulator comprises a terpinolene.

7. The dispersion of claim 5, wherein the solution polymerizing (I) is performed in the presence the polymerization regulator.

8. The dispersion of claim 7, wherein the polymerization regulator comprises terpinolene.

9. The dispersion of claim 5, wherein the emulsion polymerizing (III) is performed in the presence of the polymerization regulator.

10. The dispersion of claim 9, wherein the polymerization regulator comprises terpinolene.

11. A method of sizing paper, board, or cardboard, the method comprising contacting a sizer comprising the dispersion of claim 1 with paper, board, or cardboard.

12. The dispersion of claim 1, wherein the second monomer mixture comprises:
(i) 0 to 29% by weight of styrene;
(ii) 71 to 100% by weight of tert-butyl acrylate.

13. The dispersion of claim 1, wherein the first monomer mixture comprises:
(a) 20 to 35% by weight of the mixture comprising (a1) the (meth)acrylate and (a2) the (meth)acrylamide.

14. The dispersion of claim 1, wherein the first monomer mixture comprises:
(b) 50 to 70% by weight of the at least one optionally substituted styrene.

15. The dispersion of claim 1, wherein the first monomer mixture comprises:
(c) 0.7 to 3.5% by weight of the at least one ethylenically unsaturated monomer comprising an acid group.

16. The dispersion of claim 1, wherein the first monomer mixture comprises:
(a) 20 to 35% by weight of the mixture comprising (a1) the (meth)acrylate and (a2) the (meth)acrylamide;
(b) 50 to 70% by weight of the at least one optionally substituted styrene; and
(c) 0.7 to 3.5% by weight of the at least one ethylenically unsaturated monomer comprising an acid group.

17. The dispersion of claim 1, wherein the second monomer mixture comprises:
(i) 0 to 29% by weight of styrene;
(ii) 71 to 100% by weight of the mixture of n-butyl acrylate and tert-butyl acrylate in a weight ratio range of 3:1 to 1:3.

* * * * *